United States Patent
Zhu et al.

(10) Patent No.: US 11,262,121 B2
(45) Date of Patent: Mar. 1, 2022

(54) REFRIGERATOR

(71) Applicant: HAIER SMART HOME CO., LTD., Shandong (CN)

(72) Inventors: Xiaobing Zhu, Qingdao (CN); Peng Li, Qingdao (CN); Ming Wang, Qingdao (CN); Jianbin Dai, Qingdao (CN); Tong Xu, Qingdao (CN)

(73) Assignee: HAIER SMART HOME CO., LTD., Qingdao (CN)

( * ) Notice: Subject to any disclaimer, the term of this patent is extended or adjusted under 35 U.S.C. 154(b) by 59 days.

(21) Appl. No.: 16/706,420

(22) Filed: Dec. 6, 2019

(65) Prior Publication Data

US 2020/0109892 A1 Apr. 9, 2020

Related U.S. Application Data

(63) Continuation of application No. PCT/CN2018/089913, filed on Jun. 5, 2018.

(30) Foreign Application Priority Data

Jun. 6, 2017 (CN) .......................... 201710420156.9

(51) Int. Cl.
*F25D 23/12* (2006.01)
*A23L 3/365* (2006.01)
(Continued)

(52) U.S. Cl.
CPC .............. *F25D 23/12* (2013.01); *A23L 3/365* (2013.01); *H05B 6/62* (2013.01); *H05B 6/688* (2013.01);
(Continued)

(58) Field of Classification Search
CPC ................. F25D 23/12; F25D 2400/02; F25D 2700/121; A23B 4/07; A23L 3/365; H05B 6/50; H05B 6/62; H05B 6/688
See application file for complete search history.

(56) References Cited

U.S. PATENT DOCUMENTS 4,296,299 A 10/1981 Stottmann et al.
9,655,173 B2 * 5/2017 Kang ................. H05B 6/647
(Continued)

FOREIGN PATENT DOCUMENTS

CN 102235693 A 11/2011
CN 104957238 A 10/2015
(Continued)

OTHER PUBLICATIONS

Machine translation of CN 104957238, Oct. 7, 2015; eSpacenet, description.*
(Continued)

*Primary Examiner* — Filip Zec
(74) *Attorney, Agent, or Firm* — Alston & Bird LLP (57) ABSTRACT

A refrigerator has a thawing device. The thawing device includes a cylinder, having a thawing chamber with a forward opening; a device door; and a radio frequency generation module, upper and lower electrode plates electrically connected thereto generating radio frequency waves in the thawing chamber; and at least one temperature sensor is disposed on the inner wall of the thawing chamber and configured to sense the temperature of an object to be processed, thereby adjusting the power of the radio frequency generaton module to prevent the object to be processed from being excessively thawed.

13 Claims, 8 Drawing Sheets

(51) Int. Cl.
*H05B 6/62* (2006.01)
*H05B 6/68* (2006.01)

(52) U.S. Cl.
CPC .... *F25D 2400/02* (2013.01); *F25D 2700/121* (2013.01)

(56) References Cited

U.S. PATENT DOCUMENTS

2017/0055769 A1   3/2017   Grimaldi et al.
2018/0042074 A1   2/2018   Qiu et al.

FOREIGN PATENT DOCUMENTS

| CN | 106288626 A | 1/2017 |
|---|---|---|
| CN | 1063 87607 A | 2/2017 |
| CN | 207081264 U | 3/2018 |
| CN | 207081265 U | 3/2018 |
| CN | 207095130 U | 3/2018 |
| CN | 207095131 U | 3/2018 |
| CN | 207095160 U | 3/2018 |
| CN | 207247701 U | 4/2018 |
| CN | 207247702 U | 4/2018 |
| JP | S53 104463 A | 9/1978 |
| JP | S53 140656 A | 12/1978 |
| JP | 2002156116 A | 5/2002 |
| WO | WO-2017/065533 A1 | 4/2017 |

OTHER PUBLICATIONS

International Search Report and Written Opinion for PCT/CN2018/089913 filed Jun. 5, 2018 (9 pages).
1st Office Action the priority application No. CN 2017104201569X dated Jun. 6, 2017.
1st Search Report the priority application No. CN 2017104201569X dated Jun. 6, 2017.
2nd Office Action the priority application No. CN 2017104201569X dated Feb. 3, 2020.
2nd Search Report the priority application No. CN 2017104201569X dated Jan. 19, 2020.
European Search Report for EP Application No. 18812979.5 dated Apr. 23, 2020 (4 pages).
Office Action for EP Application No. 18812979.5 dated Jun. 10, 2020 (5 pages).
International Preliminary Report on Patentability for PCT/CN2018/089913 dated Dec. 10, 2019 (7 pages).

* cited by examiner

REFRIGERATOR

CROSS-REFERENCE TO RELATED APPLICATIONS

This application is a continuation of PCT/CN2018/089913, filed on Jun. 5, 2018, which claims priority to Chinese Application No. 201710420156.9, filed Jun. 6, 2017, the entire contents of which are incorporated herein by reference.

FIELD OF THE INVENTION

The present invention relates to the field of thawing, and particularly relates to a refrigerator with a quick thawing function.

BACKGROUND OF THE INVENTION

In the freezing process of food, the quality of the food is maintained, but the frozen food needs to be thawed before processing or eating. In order to facilitate a user to freeze and thaw the food, in the prior art, the food is generally thawed by disposing a heating device or a microwave device in a refrigerator.

However, it is generally takes a long time to thaw food by means of the heating device, and the thawing time and temperature are not easy to grasp, which is prone to water evaporation and juice loss of the food, resulting in quality loss of the food; and thawing food by means of the microwave device is fast and efficient, so that the nutrient loss of the food is very low, however, due to a difference in penetration and absorption of water and ice by microwaves and the uneven distribution of internal substances in the food, the melted regions absorb more energy, resulting in the problems of uneven thawing and local overheating. Under comprehensive consideration, there is a need for a refrigerator capable of ensuring the food quality.

BRIEF DESCRIPTION OF THE INVENTION

The present invention is directed to provide a refrigerator capable of ensuring the quality of an object to be processed.

The present invention is further directed to improve the thawing efficiency of the refrigerator.

Specifically, the present invention provides a refrigerator, including a refrigerator body defining at least one containing space, a compartment door for opening and closing the at least one containing space separately, and a thawing device disposed in one containing space, where the thawing device includes:

a cavity, defining a thawing chamber having a forward opening therein, the thawing chamber being configured for placement of an object to be processed;

a device door, disposed at the forward opening of the thawing chamber and configured to open and close the thawing chamber;

a radio frequency generation module, configured to generate a radio frequency signal; and an upper electrode plate and a lower electrode plate, horizontally disposed on a top wall and a bottom wall of the thawing chamber respectively and electrically connected with the radio frequency generation module respectively to generate radio frequency waves of corresponding frequencies in the thawing chamber according to the radio frequency signal and thaw the object to be processed in the thawing chamber; and at least one temperature sensor is disposed on an inner wall of the thawing chamber and configured to sense a temperature of the object to be processed and adjust a working power of the radio frequency generation module according to the temperature of the object to be processed to prevent the object to be processed from being excessively thawed.

Optionally, the number of the at least one temperature sensor is three; the three temperature sensors are respectively disposed on two transverse side walls and a rear wall of the thawing chamber; and the temperature of the object to be processed is an average value of temperatures sensed by the three temperature sensors.

Optionally, the three sensors are disposed at intervals in a vertical direction of the thawing device.

Optionally, the radio frequency generation module is configured as follows:

when an absolute value of a difference between the temperature of the object to be processed and a preset temperature constant value is greater than or equal to a first temperature difference threshold, the working power is a rated power;

when the absolute value of the difference between the temperature of the object to be processed and the preset temperature constant value is less than the first temperature difference threshold and greater than or equal to a second temperature difference threshold, the working power is 50 to 60% of the rated power; and when the absolute value of the difference between the temperature of the object to be processed and the preset temperature constant value is less than the second temperature difference threshold, the working power is 20 to 30% of the rated power, wherein the first temperature difference threshold is greater than the second temperature difference threshold.

Optionally, the radio frequency generation module is configured as follows:

when a change rate of the temperature of the object to be processed is greater than or equal to a first temperature rate threshold, the working power is a rated power;

when the change rate of the temperature of the object to be processed is less than the first temperature rate threshold and greater than or equal to a second temperature rate threshold, the working power is 50 to 60% of the rated power; and when the change rate of the temperature of the object to be processed is less than the second temperature rate threshold, the working power is 20 to 30% of the rated power, wherein the first temperature rate threshold is greater than the second temperature rate threshold.

Optionally, the refrigerator further includes:

a thawing switch, disposed on any one of the compartment doors and configured to control the start and stop of a thawing program; and the radio frequency generation module is configured to:

start to work when the thawing switch is turned on; and stop working when the thawing switch is turned off.

Optionally, a refrigerating system of the refrigerator is configured to:

stop providing a cooling capacity for the containing space provided with the thawing device when the thawing switch is turned on; and run an original refrigerating program of the refrigerator when the thawing switch is turned off.

Optionally, the thawing device further includes: a detection module, configured to detect an incident wave signal and a reflected wave signal of an electrical connection wire connecting the radio frequency generation module to the upper electrode plate, and calculate a load impedance of the radio frequency generation module according to a voltage and a current of the incident wave signal and a voltage and a current of the reflected wave signal.

Optionally, the thawing device further includes: a load compensation module, configured to controllably increase or reduce the load impedance of the radio frequency generation module, and enable a difference between the load impedance of the radio frequency generation module and an output impedance of the radio frequency generation module to be greater than or equal to a first impedance threshold and less than or equal to a second preset impedance threshold to improve the thawing efficiency of the object to be processed.

Optionally, the detection module is configured to further calculate a change rate of a dielectric coefficient of the object to be processed according to the load impedance of the radio frequency generation module, and the radio frequency generation module is configured to:

stop working when the change rate of the dielectric coefficient of the object to be processed decreases to be less than or equal to a dielectric rate threshold.

Compared with a thawing device with a fixed thawing power in the prior art, the present invention has the advantages that the real-time working power of the radio frequency generation module is adjusted according to the temperature of the object to be processed to prevent the object to be processed from being excessively thawed and further ensure the quality of the object to be processed.

Further, the load impedance of the radio frequency generation module is calculated by detecting the incident wave signal and the reflected wave signal of the electrical connection wire connecting the radio frequency generation module to the upper electrode plate, and the radio frequency generation module is small in occupied space and low in cost and is especially suitable for the thawing device in the refrigerator. Furthermore, the load compensation module makes the difference between the load impedance of the radio frequency generation module and the output impedance of the radio frequency generation module be within a preset range, thereby improving the thawing efficiency of the object to be processed.

Further, the change rate of the dielectric coefficient of the object to be processed is calculated by the detection module to determine whether the thawing is completed or not. Compared with the mode of determining whether the thawing is completed or not by sensing the temperature of the object to be processed in the prior art, the determining mode of the present invention is more accurate, and the object to be processed can be further prevented from being excessively thawed. Tests show that the temperature of the object to be processed, thawed by the thawing device of the present invention, is generally −4 to −2° C. when the thawing is completed, and bloody water generated by thawing when the object to be processed is meat can be avoided.

DETAILED DESCRIPTION

The present invention will be described in detail below in conjunction with specific implementations as shown in drawings. However, these implementations do not limit the present invention. Structures, methods, or functional changes made by a person of ordinary skill in the art according to these implementations are all included in the protection scope of the present invention.

Figure 1:
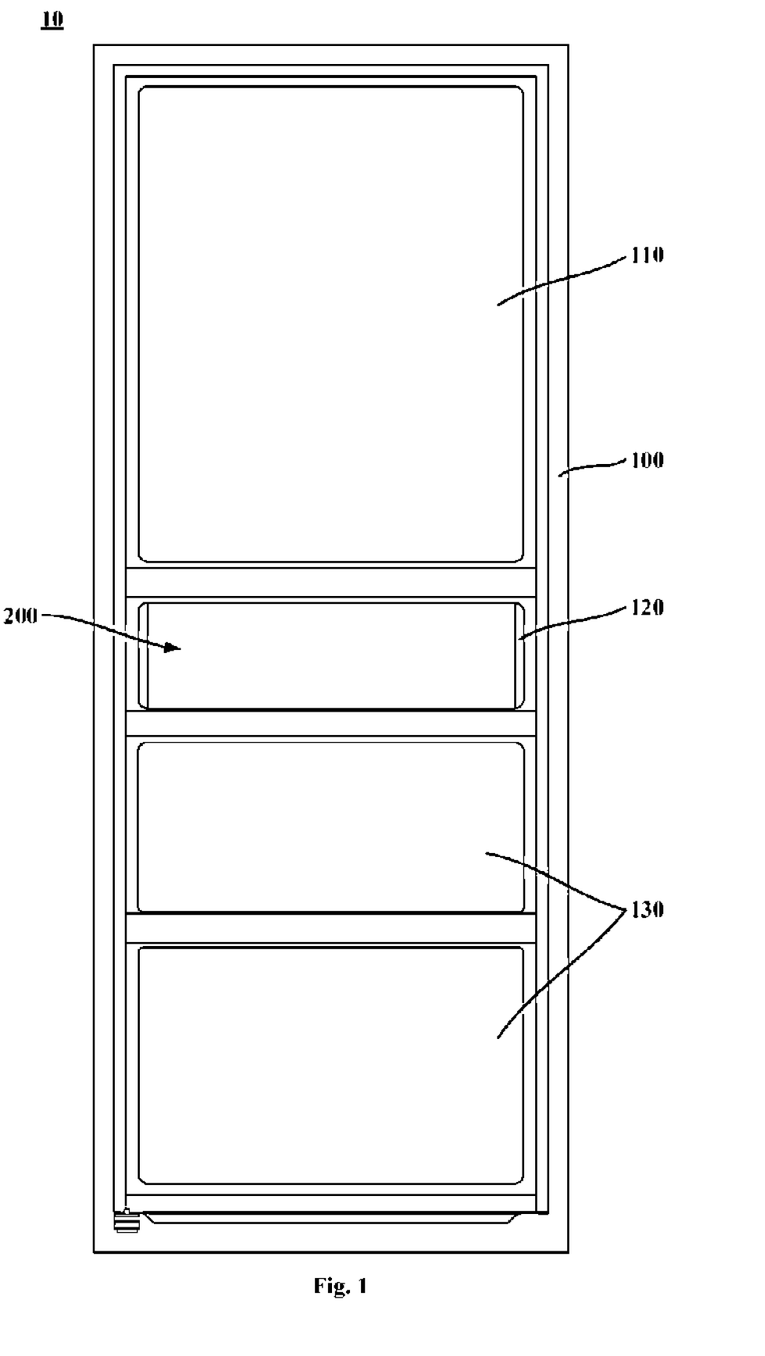
FIG. 1 is a schematic structural view of a refrigerator according to an embodiment of the present invention, where all outer doors of the refrigerator are removed to show chamber structures in a refrigerator body of the refrigerator.
Figure 2:
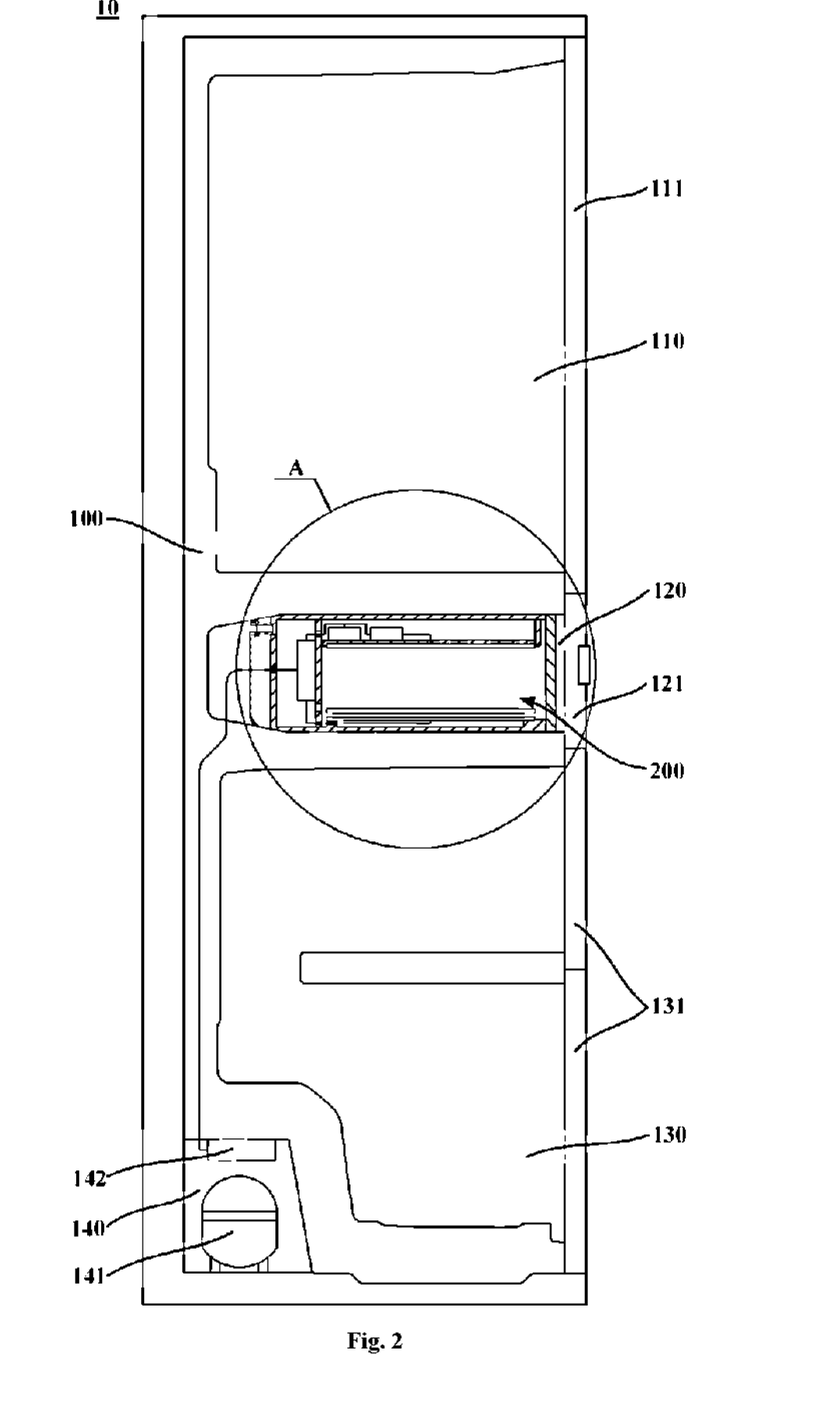
FIG. 2 is a schematic cross-sectional view of the refrigerator as shown in FIG. 1.
Figure 3:
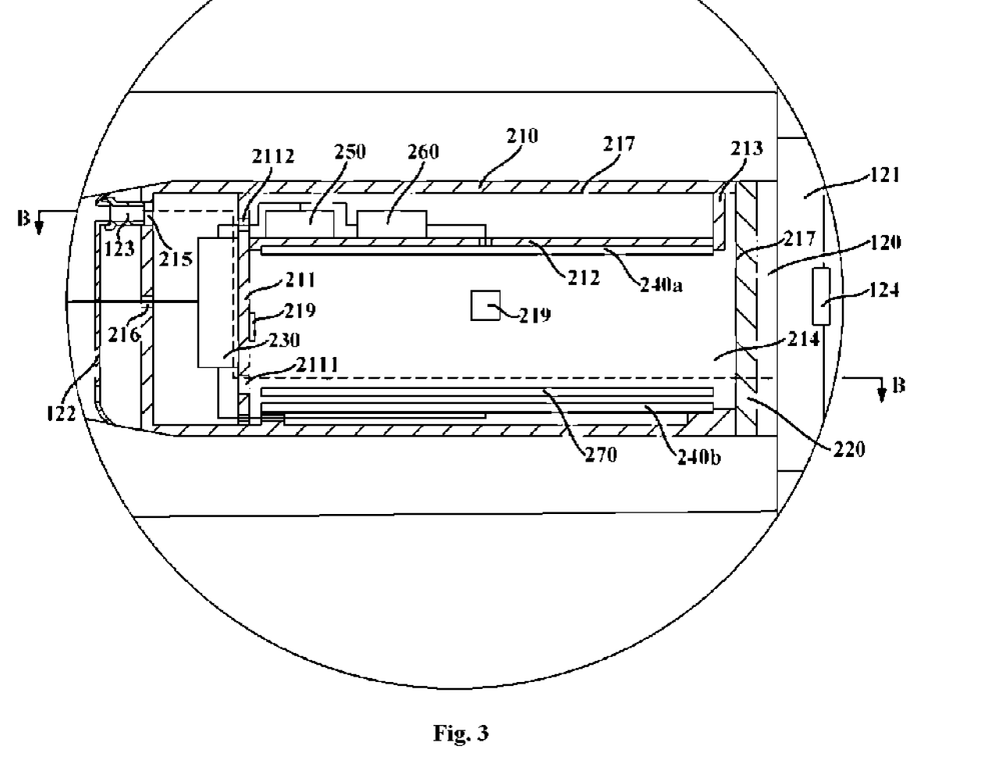
FIG. 3 is a schematic partial enlarged view of a region A in FIG. 2.

FIG. 1 is a schematic structural view of a refrigerator 10 according to an embodiment of the present invention, where all outer doors of the refrigerator 10 are removed to show chamber structures in a refrigerator body 100 of the refrigerator 10. FIG. 2 is a schematic cross-sectional view of the refrigerator 10 as shown in FIG. 1. FIG. 3 is a schematic partial enlarged view of a region A in FIG. 2. Referring to FIG. 1 to FIG. 3, the refrigerator 10 may generally include the refrigerator body 100 defining at least one containing space, a compartment door for opening and closing the access port of each containing space separately, and a thawing device 200 disposed in one containing space.

Specifically, the thawing device 200 may include a cavity 210, a device door 220, a radio frequency generation module 230, an upper electrode plate 240a and a lower electrode plate 240b. The cavity 210 may include a top plate, a bottom is plate, a rear plate and two transverse side plates opposite to each other, and may define a thawing chamber 214 having a forward opening therein, and the thawing chamber 214 is configured for placement of an object to be processed. The device door 220 may be disposed at the forward opening of the thawing chamber 214 and configured to open or close the thawing chamber 214. The device door 220 and the cavity 210 may be mounted together through an appropriate method, such as left-hand door, right-hand door and swing-up door. The radio frequency generation module 230 may be configured to generate a radio frequency signal (generally a radio frequency signal having a frequency between 300 KHz and 300 GHz). The upper electrode plate 240a and the lower electrode plate 240b may be horizontally disposed on a top wall and a bottom wall of the thawing chamber 214 respectively and electrically connected with the radio frequency generation module 230 respectively to generate radio frequency waves of corresponding parameters in the thawing chamber 214 according to the radio frequency signal generated by the radio frequency generation module 230, and thaw the object to be processed in the thawing chamber 214. In the present invention, the upper electrode plate 240a is a transmitting antenna, and the lower electrode plate 240b is a receiving antenna. In some embodiments, the upper electrode plate 240a and the lower electrode plate 240b may be electrically connected with the radio frequency generation module 230 respectively by adopting a 50-ohm electrical connection wire.

Particularly, at least one temperature sensor 219 may be disposed on an inner wall of the thawing chamber 214. That is, the number of the temperature sensor 219 may be one, two, three or more. The temperature sensor 219 may be configured to sense the temperature of the object to be processed. A real-time working power of the radio frequency generation module 230 is adjusted according to the temperature of the object to be processed to prevent the object to be processed from being excessively thawed. Compared with a thawing device with a fixed thawing power in the prior art, the present invention has the advantages that the real-time working power of the radio frequency generation module 230 is determined according to the temperature of the object to be processed to prevent the object to be processed from being excessively thawed and further ensure the quality of the object to be processed.

In some exemplary embodiments, the number of the temperature sensor 219 may be three. The three temperature sensors 219 may be respectively disposed on two transverse side walls and a rear wall of the thawing chamber 214. The temperature of the object to be processed is an average value of temperatures sensed by the three temperature sensors 219 to ensure the accuracy of the obtained temperature of the object to be processed. In some further exemplary embodiments, the three temperature sensors 219 are disposed at intervals in a vertical direction of the thawing device 200 to ensure that the temperatures of objects to be processed at different heights can be sensed. In the present embodiment, the three temperature sensors 219 may be respectively disposed at ⅓, ½ and ⅔ of the height of the thawing chamber 214.

In some embodiments, the radio frequency generation module 230 may be configured as follows: when an absolute value of a difference between the temperature of the object to be processed and a preset temperature constant value is greater than or equal to a first temperature difference threshold, the working power is a rated power; when the absolute value of the difference between the temperature of the object to be processed and the preset temperature constant value is less than the first temperature difference threshold and greater than or equal to a second temperature difference threshold, the working power is 50 to 60% of the rated power, such as 50%, 55% or 60%; when the absolute value of the difference between the temperature of the object to be processed and the preset temperature constant value is less than the second temperature difference threshold, the working power is 20 to 30% of the rated power, such as 20%, 25% or 30%. The first temperature difference threshold is greater than the second temperature difference threshold. In the present embodiment, the preset temperature constant value may be −4 to −2° C., such as −4° C., −3° C. or −2° C. The rated power of the radio frequency generation module 230 may be 100 to 150 W.

In some other embodiments, the radio frequency generation module 230 may be configured as follows: when a change rate of the temperature of the object to be processed is greater than or equal to a first temperature rate threshold, the working power is a rated power; when the change rate of the temperature of the object to be processed is less than the first temperature rate threshold and greater than or equal to a second temperature rate threshold, the working power is 50 to 60% of the rated power, such as 50%, 55% or 60%; when the change rate of the temperature of the object to be processed is less than the second temperature rate threshold, the working power is 20 to 30% of the rated power, such as 20%, 25% or 30%. The first temperature rate threshold is greater than the second temperature rate threshold.

Prior to the present invention, it is generally recognized by those skilled in the art that when the temperature of the object to be processed is higher (i.e., the temperature of the object to be processed is greater than or equal to −7° C.), the thermal effect is significantly attenuated, so that the object to be processed is not excessively thawed. However, this is not the case. Generally, the radio frequency thawing power is larger (e.g., greater than 100 W). When the temperature of the object to be processed is higher, the object to be processed is prone to excessive thawing. The inventor of the present application has creatively recognized that when the temperature of the object to be processed is higher, the object to be processed can be effectively prevented from being excessively thawed by reducing the working power of the radio frequency generation module 230.

In some embodiments, the thawing device 200 may further include a detection module 250. The detection module 250 may be configured to detect an incident wave signal and a reflected wave signal of an electrical connection wire connecting the radio frequency generation module 230 to the upper electrode plate, and calculate the load impedance of the radio frequency generation module 230 according to a voltage and a current of the incident wave signal and a voltage and a current of the reflected wave signal. The calculation formulas of the load impedance are as follows:

$$SWR = Z_2/Z_1 \quad (1)$$

$$Z_1 = U_1/I_1 = R_1 + jX_1 \quad (2)$$

$$Z_2 = U_2/I_2 = R_2 + jX_2 \quad (3)$$

In the formulas (1), (2) and (3), SWR is standing wave ratio, $Z_1$ is output impedance, $Z_2$ is load impedance, $U_1$ is incident wave voltage; $I_1$ is incident wave current, $R_1$ is output resistance, $X_1$ is output reactance, $U_2$ is reflected wave voltage, $I_2$ is reflected wave current, $R_2$ is load resistance, and $X_2$ is load reactance. It can be understood by those skilled in the art that the output impedance is the impedance of the electrical connection wire connecting the radio frequency generation module 230 to the upper electrode plate 240a, and the load impedance is the impedance of the object to be processed.

The thawing device 200 may further include a load compensation module 260. The load compensation module 260 may include a compensation unit and a motor for adjusting the load of the compensation unit. The compensation unit may be disposed in series with the object to be processed. That is, the load impedance of the radio frequency generation module 230 is the sum of the impedance of the object to be processed and the impedance of the compensation unit. The motor may be configured to controllably increase or reduce the load of the compensation unit to increase or reduce the load impedance $Z_2$ of the radio frequency generation module 230, and enable a difference (a value obtained by subtracting the output impedance $Z_1$ from the load impedance $Z_2$) between the load impedance $Z_2$ of the radio frequency generation module 230 and the output impedance $Z_1$ of the radio frequency generation module to be greater than or equal to a first impedance threshold and less than or equal to a second impedance threshold (the first impedance threshold is less than the second impedance threshold) to improve the thawing efficiency of the object to be processed. In some exemplary embodiments, the first impedance threshold is −6 to −4% of the output impedance $Z_1$, and the second impedance threshold is 4 to 6% of the output impedance $Z_1$. Further preferably, the first impedance threshold is −5% of the output impedance $Z_1$, and the second impedance threshold is 5% of the output impedance $Z_1$. In other words, the load compensation module may be configured to enable an absolute value of the difference between the load impedance $Z_2$ of the radio frequency generation module 230 and the output impedance $Z_1$ of the radio frequency generation module to be always less than 5% of the output impedance $Z_1$ in a whole thawing process, such as 1%, 3% or 5% of the output impedance $Z_1$.

The detection module 250 may be configured to further calculate a dielectric coefficient of the object to be processed and a change rate of the dielectric coefficient according to the load impedance $Z_2$ of the radio frequency generation module 230 to determine the thawing progress of the object to be processed. The calculation formulas of the dielectric coefficient of the object to be processed are as follows:

$$X_2 = 1/2\pi fC \quad (4)$$

$$\varepsilon = 4\pi KdC/S \quad (5)$$

In the formulas (4) and (5), f is frequency of radio frequency wave, C is capacitance of a capacitor constituted by the upper electrode plate 140a and the lower electrode plate 140b, ε is dielectric coefficient of the object to be processed, K is static constant, d is thickness of the upper electrode plate, and S is area of the upper electrode plate.

Figure 5:
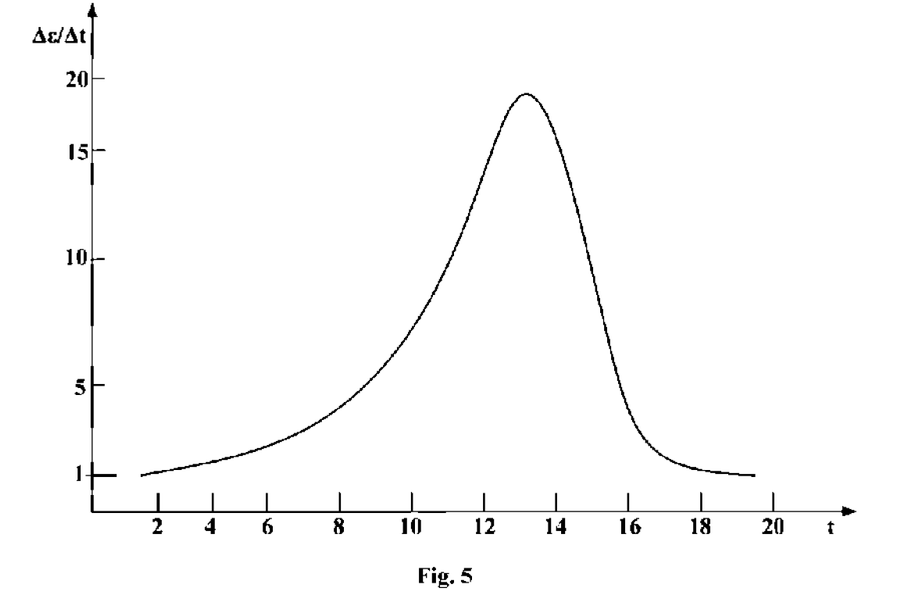
FIG. 5 is a graph showing a change rate of a dielectric coefficient of an object to be processed according to an embodiment of the present invention.

The change rate of the dielectric coefficient of the object to be processed can be obtained by calculating a change value Δε of the dielectric coefficient ε within a unit time Δt, where Δt may be 0.1 s to 1 s, such as 0.1 s, 0.5 s or 1 s. FIG. 5 is a graph showing a change rate of a dielectric coefficient of an object to be processed according to an embodiment of the present invention, where the longitudinal coordinate is the change rate Δε/Δt of the dielectric coefficient of the object to be processed, and the horizontal coordinate is the thawing time t (unit: min) of the object to be processed. Referring to FIG. 5, in some exemplary embodiments, the radio frequency generation module 230 may be configured to: stop working when the change rate Δε/Δt of the dielectric coefficient of the object to be processed decreases to be less than or equal to a dielectric rate threshold. The dielectric rate threshold may be 1 to 2, such as 1, 1.5 or 2.

As the temperature of the object to be processed changes, the dielectric coefficient of the object to be processed also changes, which is well known to those skilled in the art. However, the dielectric coefficient is usually measured by a special instrument (for example, a dielectric coefficient tester), and the special instrument is large in occupied space and high in cost and is not suitable for a refrigerator. In the present invention, the load impedance of the radio frequency generation module 230 and the change rate of the dielectric coefficient of the object to be processed are calculated by detecting the incident wave signal and the reflected wave signal of the electrical connection wire connecting the radio frequency generation module 230 to the upper electrode plate, and the radio frequency generation module 230 is small in occupied space and low in cost and is especially suitable for the thawing device 200 in the refrigerator.

Furthermore, the load compensation module 260 makes the difference between the load impedance of the radio frequency generation module 230 and the output impedance of the radio frequency generation module be within a preset range, thereby improving the thawing efficiency of the object to be processed.

Further, whether the thawing is completed or not is determined according to the change rate of the dielectric coefficient of the object to be processed. Compared with the mode of determining whether the thawing is completed or not by sensing the temperature of the object to be processed in the prior art, the determining mode of the present invention is more accurate, and the object to be processed can be further prevented from being excessively thawed. Tests show is that the temperature of the object to be processed, thawed by the thawing device of the present invention, is generally −4 to −2° C. when the thawing is completed, and bloody water generated by thawing when the object to be processed is meat can be avoided.

In some embodiments, a thawing switch 124 for controlling the start or stop of a thawing program may be disposed on any one of compartment doors. The radio frequency generation module 230 may be configured to start to work when the thawing switch 124 is turned on and stop working when the thawing switch 124 is turned off In a thawing process, a user can terminate the thawing program by turning off the thawing switch 124. In some exemplary embodiments, a refrigerating system of the refrigerator 10 may be configured to stop providing a cooling capacity for the containing space provided with the thawing device when the thawing switch 124 is turned on, and run an original refrigerating program of the refrigerator 10 when the thawing switch 124 is turned off to reduce the influence of the refrigerating system of the refrigerator 10 on the temperature of the thawing chamber 214 when the thawing device 200 thaws the object to be processed. The refrigerating system of the refrigerator 10 may include a compressor, a condenser, a capillary and an evaporator for providing the cooling capacity.

A buzzer (not shown) may also be disposed on any one of the compartment doors and is configured to prompt a user that the object to be processed is thawed. The buzzer may be configured to start to work when the detection module 250 determines that the object to be processed is thawed (the change rate of the dielectric coefficient of the object to be processed decreases to be less than or equal to the second rate threshold), and stop working when the object to be processed is taken out of the thawing chamber 214. An infrared sensor may be disposed on the inner wall of the thawing chamber 214 and is configured to sense whether an object to be processed is placed in the thawing chamber 214.

Figure 6:
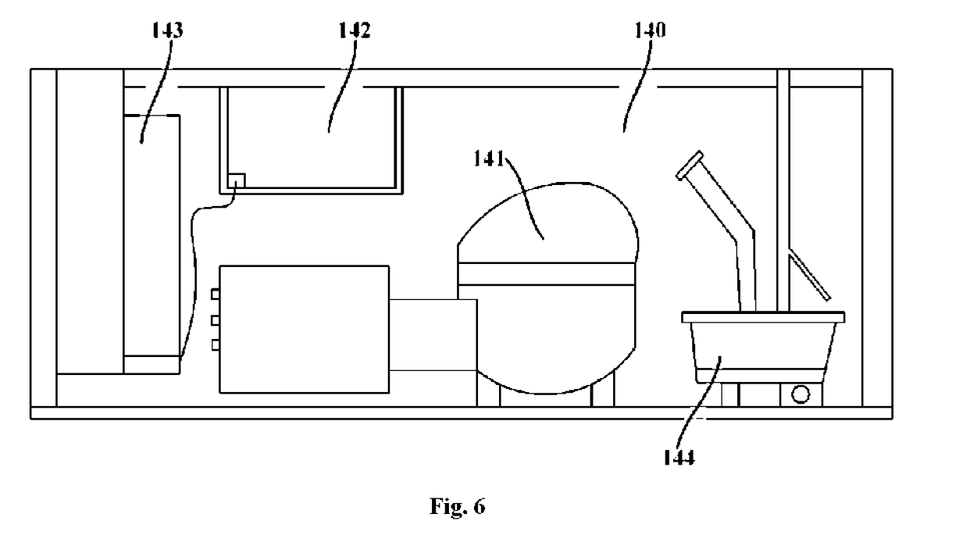
FIG. 6 is a schematic structural view of a compressor room in FIG. 2.

FIG. 6 is a schematic structural view of a compressor room 140 in FIG. 2. Referring to FIG. 6, the refrigerator body 100 of the refrigerator 10 also defines the compressor room 140. The compressor room 140 may include a main control panel 143 for controlling operation of the refrigerator 10, a compressor 141, a condensed water collecting structure 144 and an external power wire (not shown) for supplying power for operation of the refrigerator 10, which are sequentially disposed. In some embodiments, the refrigerator 10 may further include a power is supply module 142 for supplying power for the thawing device 200. The power supply module 142 may be disposed in the compressor room 140 of the refrigerator 10 to facilitate heat dissipation and maintenance of the power supply module 142. The power supply module 142 may be fixed on the upper wall of the compressor room 140 to facilitate electrical connection of the thawing device 200 to the power supply module 142. The power supply module 142 may be an ACDC converter. The ACDC converter may be electrically connected with the main control panel 143 to supply power for the thawing device 200. The power supply module 142 may be disposed between the main control panel 143 and the compressor 141 to make the electrical connection between the power supply module 142 and the main control panel 143 more convenient. It can be understood by those skilled in the art that it is easy to connect each component of the thawing device 200 with the control circuit of the refrigerator 10.

Figure 4:
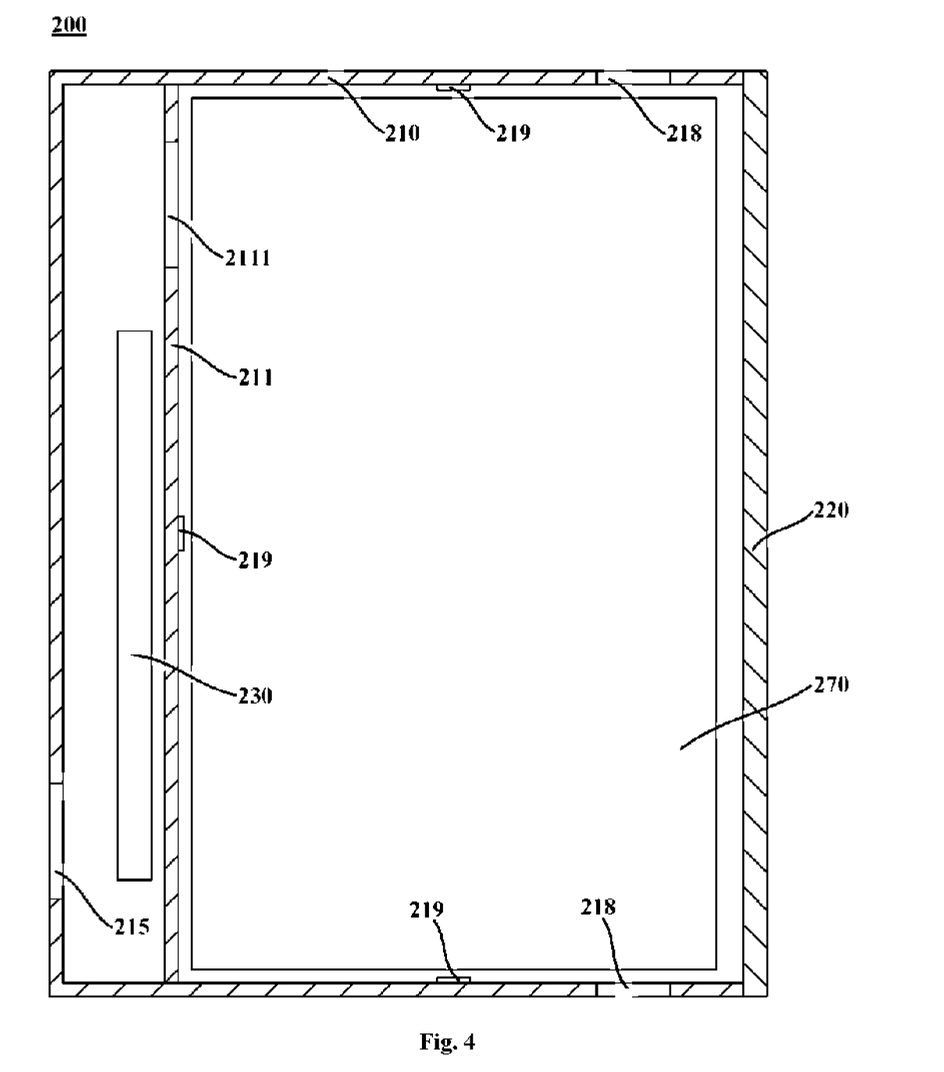
FIG. 4 is a schematic cross-sectional view taken along a section line B-B in FIG. 3.

FIG. 4 is a schematic cross-sectional view taken along a section line B-B in FIG. 3. Referring to FIG. 3 and FIG. 4, the cavity 210 may further include a vertical clapboard 211 and a horizontal clapboard 212 for defining an inner space of the cavity 210. The vertical clapboard 211 may be configured to extend from the top plate of the cavity 210 along a vertical direction to the bottom plate of the cavity 210. The radio frequency generation module 230 may be disposed between the vertical clapboard 211 and the rear plate of the cavity 210. The horizontal clapboard 212 may be configured to extend forward from the vertical clapboard 211 along a horizontal direction. The detection module 250 and the load compensation module 260 may be disposed between the horizontal clapboard 212 and the top plate of the cavity 210. The thawing chamber 214 may be enclosed by the vertical clapboard 211, the horizontal clapboard 212 and the bottom plate and two transverse side plates of the cavity 210. The upper electrode plate 240*a* may be disposed on the lower surface of the horizontal clapboard 212, and the lower electrode plate 240*b* may be disposed on the upper surface of the bottom plate of the cavity 210. The cavity 210 may further include a baffle plate 213 extending upward from a front side end of the horizontal clapboard 212 along a vertical direction to the top plate of the cavity 210, to prevent the exposure of the detection module 250 and the load compensation module 260 from affecting the aesthetics of the thawing device 200. In other embodiments, according to actual conditions (sizes of the radio frequency generation module 230, the detection module 250 and the load compensation module 260), the horizontal clapboard is 212 may be configured to extend forward from the rear plate of the cavity 210 along a horizontal direction, and the vertical clapboard 211 may be configured to extend from the horizontal clapboard 212 along a vertical direction to the bottom plate of the cavity 210.

The vertical clapboard 211 may be provided with a first wire passing port 2112, so that the radio frequency generation module 230 is electrically connected with the upper electrode plate 240*a* through the first wire passing port 2112. The rear plate of the cavity 210 may be provided with a second wire passing port 216, so that the power supply module 142 is electrically connected with the radio frequency generation module 230 through the second wire passing port 216.

In some embodiments, the rear plate of the cavity 210 may be provided with a device air inlet 215, and the vertical clapboard 211 at the rear side of the thawing chamber 214 may be provided with a thawing air inlet 2111, so that the air in the containing space provided with the thawing device 200 enters the thawing chamber 214 of the thawing device 200 through the device air inlet 215 and the thawing air inlet 2111. Side plates at two transverse sides of the thawing chamber 214 may be provided with device air outlets 218, so that the gas in the thawing chamber 214 is discharged to the containing space through the device air outlets 218. A distance between the thawing device 200 and the inner walls of the two transverse sides of the containing space provided with the thawing device 200 may be 2 to 3 mm, such as 2 mm, 2.5 mm or 3 mm, so that the gas in the thawing chamber can be discharged to a storage chamber conveniently.

In some exemplary embodiments, the device air inlet 215 and the thawing air inlet 2111 of the thawing device 200 may be respectively disposed at two transverse sides of the radio frequency generation module 230 to facilitate heat dissipation of the radio frequency generation module 230. In some alternative embodiments, the device air inlet 215 and the thawing air inlet 2111 of the thawing device 200 may be disposed at the same side of the radio frequency generation module 230.

By disposing the device air inlet 215 and the device air outlet 218 on the thawing device 200, when no thawing instruction is received, the thawing chamber 214 may be configured for placement of food materials, so that a storage space in the refrigerator 10 is fully utilized.

The thawing device 200 may further include a tray 270. The tray 270 is disposed in the thawing chamber 214, and the object to be processed is placed on is the tray 270. The tray 270 may be configured to controllably move in a depth direction of the thawing chamber 214, so that the object to be processed can be placed and taken out conveniently. In some exemplary embodiments, a distance between a lower surface of the tray 270 and a lower electrode plate 240*b* may be 8 to 12 mm, such as 8 mm, 10 mm or 12 mm to prevent the friction between the tray 270 and the lower electrode plate 240*b* in a drawing process.

Referring to FIG. 1 to FIG. 3, in some embodiments, the number of the containing space of the refrigerator 10 may be three. Specifically, the refrigerator 10 may include a refrigerator body 100 defining a refrigerating chamber 110, a temperature-variable chamber 120 and a freezing chamber 130, and a refrigerating door 111, a temperature-variable door 121 and a freezing door 131 for opening and closing the refrigerating chamber 110, the temperature-variable chamber 120 and the freezing chamber 130 respectively. The thawing device 200 may be disposed in the temperature-variable chamber 120. The thawing device 200 may be fixed in the temperature-variable chamber 120 by interference fit or clamping with inner walls of two vertical sides of the temperature-variable chamber 120. The thawing switch 124 may be disposed on the temperature-variable door.

In addition, it can also be noted that as is well known to those skilled in the art, the refrigerating chamber 110 refers to a storage chamber having a storage temperature of 0 to +8° C. for food materials; the freezing chamber 130 refers to a storage chamber having a storage temperature of −20 to −15° C. for food materials; and the temperature-variable chamber 120 refers to a storage chamber capable of changing the storage temperature in a wider range (for example, the adjusting range may be 4° C. or above and may be adjusted to 0° C. or above or 0° C. or below), and generally, the storage temperature may span refrigerating temperature, soft freezing temperature (generally −4 to 0° C.) and freezing temperature, preferably −16 to +4° C.

In some embodiments, the refrigerator 10 according to the present invention may be an air-cooled refrigerator, and the temperature-variable chamber 120 may include an air duct cover plate 122. The air duct cover plate 122 and a rear inner wall of the temperature-variable chamber 120 clamp to form a temperature-variable air duct, and the air duct cover plate 122 is provided with a temperature-variable air inlet 1221 for providing the cooling capacity for the temperature-variable chamber 120. In some exemplary embodiments, the device air inlet 215 of the thawing device 200 may be connected with the temperature-variable air inlet 1221 through a connecting pipe 123 so as to facilitate refrigeration of the thawing chamber 214 of the thawing device 200. In other exemplary embodiments, the projection of the device air inlet 215 of the thawing device 200 in a thickness direction of the rear plate of the cavity 210 may be in the temperature-variable air inlet 1221 so as to facilitate refrigeration of the thawing chamber 214 of the thawing device 200.

Figure 7:
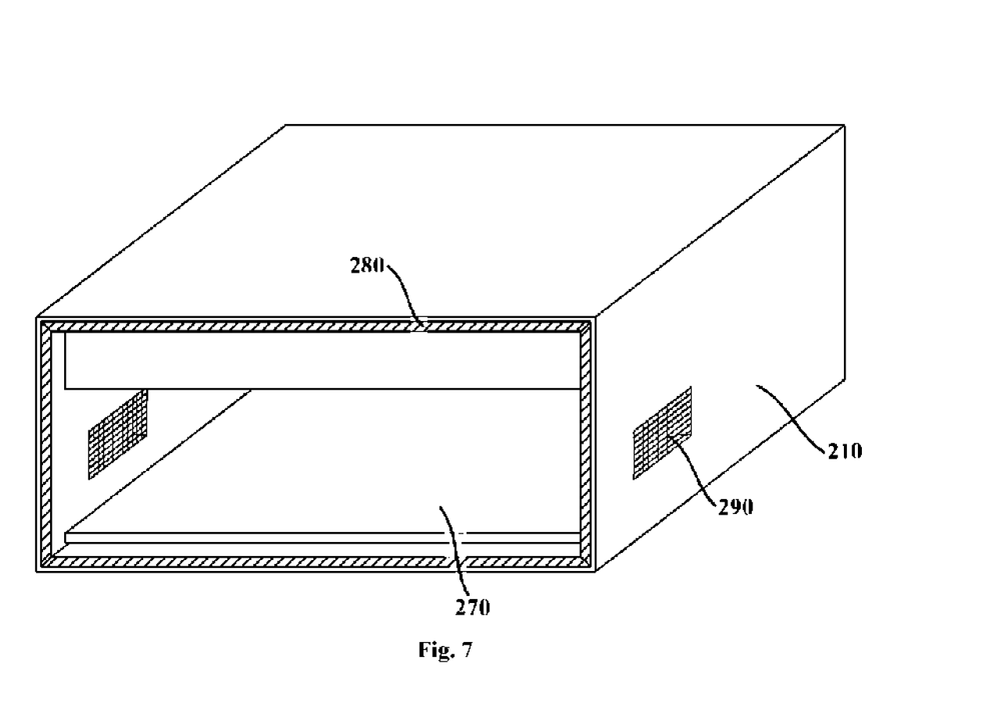
FIG. 7 is a schematic structural view of a thawing device in FIG. 3, where a device door of the thawing device is removed to show an inner structure of a cavity.

FIG. 7 is a schematic structural view of a thawing device 200 in FIG. 3, where a device door of the thawing device is removed to show an inner structure of a cavity. Referring to FIG. 7, the thawing device 200 may further include an elastic conductive loop 280. The elastic conductive loop 280 may be disposed at the periphery of the forward opening of the thawing chamber 214 so as to generate compression deformation when the device door 220 is closed, and closely fits the device door 220. That is, a seal is formed between the elastic conductive loop 280 and the device door 220. In some exemplary embodiments, the elastic conductive loop 280 may be made of silicone, silicone fluoride, EPDM, fluorocarbon-silicone fluoride, and silver-plated aluminum. The elastic conductive loop 280 may be of a hollow ring structure, so that the elastic conductive loop 280 closely fits the device door 220 when the device door 220 is closed. The width of the elastic conductive loop 280 may be 20 to 30 mm, such as 20 mm, 25 mm or 30 mm to improve the air tightness of the thawing device 200. The cavity 210 and the device door 220 may be respectively provided with electromagnetic shielding features 217. The electromagnetic shielding feature 217 disposed on the cavity 210 and the electromagnetic shielding feature 217 disposed on the device door 220 may be respectively configured to be in conductive contact with the elastic conductive loop 280, so that when the device door 220 is closed, the amount of outward magnetic leakage of the thawing device 200 is reduced, and harms to the human body are reduced. The electromagnetic shielding features 217 may be conductive coatings applied to the inner wall of the cavity 210 and an inner surface of the device door 220 (the surface facing the cavity 210), conductive metal meshes attaching to the inner wall of the cavity 210 and the inner surface of the device door 220, or conductive metal meshes formed in each of the plates enclosing the cavity 210 and in the device door 220. In some exemplary embodiments, the device air inlet 215, the thawing air inlet 2111 and the device air outlet 218 of the thawing device 200 is each may be provided with a conductive metal mesh 290, and the conductive metal mesh 290 may be configured to be in conductive connection with the electromagnetic shielding feature 217 disposed on the cavity 210 to reduce the amount of magnetic leakage of the thawing device 200.

Particularly, in the present invention, the frequency of the radio frequency signal generated by the radio frequency generation module 230 (namely the electromagnetic wave for thawing the object to be processed) may be 40 to 42 MHz, such as 40 MHz, 40.48 MHz, 40.68 MHz, 41 MHz or 42 MHz to reduce the thawing time of the object to be processed, improve the temperature uniformity of the object to be processed, and reduce the juice loss rate of the object to be processed. In exemplary embodiments, the frequency of the radio frequency wave may be a preset constant frequency in a range of 40.48 to 40.68 MHz to further reduce the thawing time of the object to be processed, improve the temperature uniformity of the object to be processed, and reduce the juice loss rate of the object to be processed. When the frequency of the radio frequency wave is 40.68 MHz, the thawing effect is the best.

In order to further understand the present invention, the preferred implementation solutions of the present invention are described below in conjunction with specific embodiments, but the present invention is not limited thereto.

TABLE 1

|  | Embodiment 1 | Embodiment 2 | Embodiment 3 | Embodiment 4 | Embodiment 5 | Comparative example 1 | Comparative example 2 |
|---|---|---|---|---|---|---|---|
| Frequency (MHz) | 40 | 40.48 | 40.68 | 41 | 42 | 13.56 | 27.12 |

In the thawing devices 200 having the radio frequencies of the Embodiments 1 to 5 and Comparative examples 1 to 2 respectively, the power of the radio frequency waves is 100 W, and the structures and the working flows of the thawing devices 200 are the same.

The thawing effects of the thawing devices 200 having the frequencies of all embodiments and all comparative examples are tested. Test explanation: 1 kg of beef having the same shape and specification and an initial temperature of −18° C. is selected and placed on the tray 270 in the thawing device 200 of each embodiment and each comparative example, and the thawing time, and the temperature uniformity and the juice loss rate of each embodiment and each comparative example are respectively measured; and the thawing time is the time from the beginning of thawing to the time when the thawing device 200 determines that the thawing is completed (i.e., the radio frequency generation module stops working). Temperature uniformity: after the thawing is completed, temperatures of four corners and a center point of the beef are respectively measured, and a difference between an average value of the four corners and the temperature of the center point is calculated; and the temperature uniformity is a ratio of the difference to the average value. Juice loss rate: a weight of the beef before thawing and a weight of the beef after thawing are respectively measured, and a difference between the two weights is calculated; and the juice loss rate is the ratio of the difference to the weight of the beef before thawing.

The test results of the thawing effects according to Embodiments 1 to 7 and Comparative examples 1 to 2 are as shown in a table 2.

TABLE 2

|  | Thawing time (min) | Temperature uniformity | Juice loss rate (%) |
|---|---|---|---|
| Embodiment 1 | 19 | 0.4 | 0.35 |
| Embodiment 2 | 18 | 0.4 | 0.32 |
| Embodiment 3 | 18 | 0.3 | 0.29 |
| Embodiment 4 | 19 | 0.5 | 0.35 |
| Embodiment 5 | 20 | 0.5 | 0.40 |
| Comparative example 1 | 25 | 0.6 | 0.35 |

TABLE 2-continued

|  | Thawing time (min) | Temperature uniformity | Juice loss rate (%) |
|---|---|---|---|
| Comparative example 2 | 23 | 0.6 | 0.40 |

According to the test results of Embodiment 5 and Comparative example 1 in the table 2, it can be seen that in the cases that the power of the radio frequency waves is the same and the structures and the working flows of the thawing devices 200 are the same, under the same test conditions, the thawing device 200 applying the radio frequency within the range of the embodiments of the present invention has a better thawing effect than the thawing device 200 applying the radio frequency in the prior art, the thawing time is reduced by 20%, and the temperature uniformity is improved by 17%.

According to the test results of Embodiments 1 to 5 in the table 2, it can be seen that the thawing device 200 applying each embodiment of the present invention has the thawing time of 20 min or below, the temperature uniformity of 0.5 or below, and the juice loss rate of 0.40% or below. By further optimizing the frequency of the radio frequency wave (40.48 to 40.68 MHz), the thawing time of is the thawing device 200 can be reduced to be 18 min or below, the temperature uniformity of the thawing device 200 can be improved to be 0.4 or below, and the juice loss rate of the thawing device 200 can be reduced to be 0.32% or below.

Figure 8:
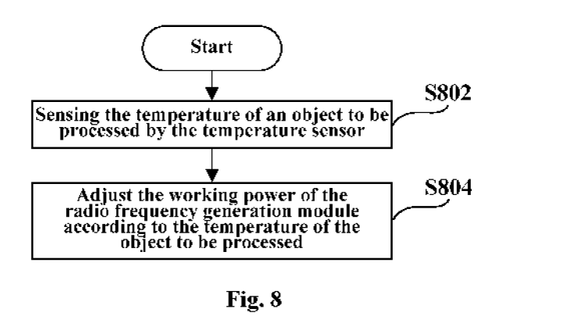
FIG. 8 is a flow chart of a thawing method for a refrigerator according to an embodiment of the present invention.

FIG. 8 is a flow chart of a thawing method for the refrigerator 10 according to an embodiment of the present invention. Referring to FIG. 8, the thawing method of the refrigerator 10 of the present invention may include the following steps:

Step S802: Sensing the temperature of an object to be processed by the temperature sensor 219.

Step S804: Adjusting the working power of the radio frequency generation module 230 according to the temperature of the object to be processed.

Figure 9:
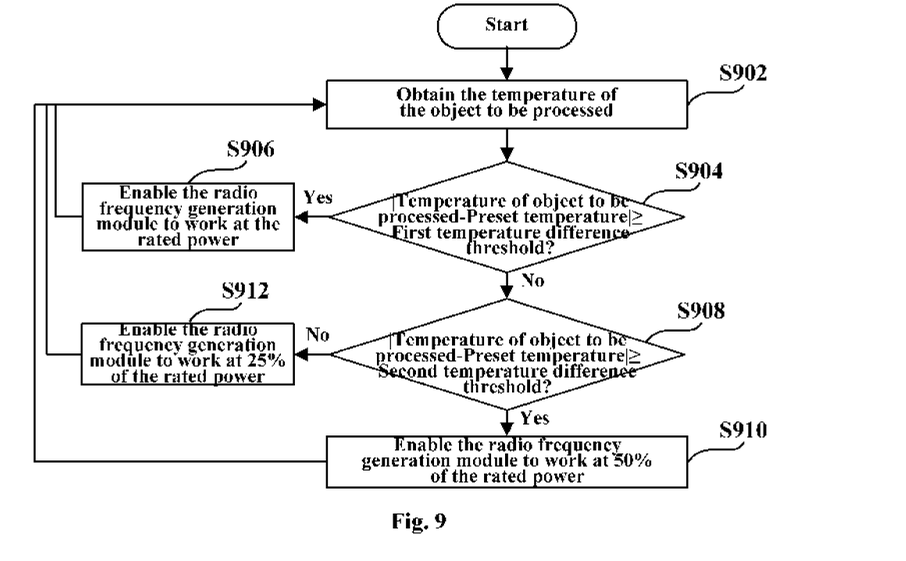
FIG. 9 is a flow chart of a method for adjusting a working power of a radio frequency generation module according to a temperature of an object to be processed according to an embodiment of the present invention.

FIG. 9 is a flow chart of a method for adjusting the working power of the radio frequency generation module 230 according to the temperature of the object to be processed according to an embodiment of the present invention. Referring to FIG. 9, the method for adjusting the working power of the radio frequency generation module 230 may include the following steps:

Step S902: Obtaining the temperature of the object to be processed.

Step S904: Determining whether the absolute value of the difference between the temperature of the object to be processed and the preset temperature constant value is greater than or equal to the first temperature difference threshold or not; if yes, executing step S906; and if not, executing step S908.

Step S906: Enabling the radio frequency generation module 230 to work at the rated power, and then, returning to step S902.

Step S908: Determining whether the absolute value of the difference between the temperature of the object to be processed and the preset temperature constant value is greater than or equal to the second temperature difference threshold or not; if yes, executing step S910; and if not, executing step S912.

Step S910: Enabling the radio frequency generation module 230 to work at 50 to 60% of the rated power; in this step, enabling the radio frequency generation module 230 to work at 50% of the rated power; and then, returning to step S902.

Step S912: Enabling the radio frequency generation module 230 to work at 20 to 30% of the rated power; in this step, enabling the radio frequency generation module 230 to work at 25% of the rated power; and then, returning to step S902.

Figure 10:
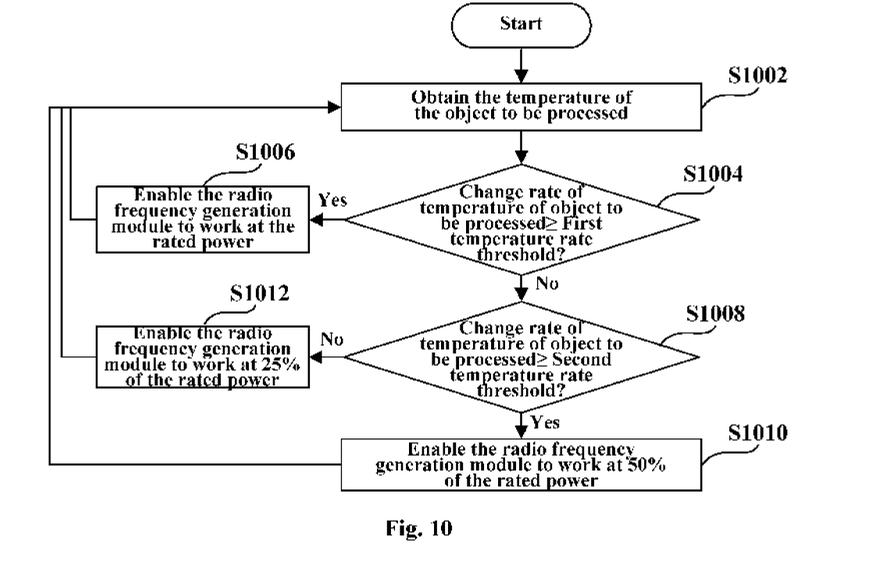
FIG. 10 is a flow chart of a method for adjusting a working power of a radio frequency generation module according to a temperature of an object to be processed according to another embodiment of the present invention.

FIG. 10 is a flow chart of a method for adjusting the working power of a radio frequency generation module according to the temperature of an object to be processed according to another embodiment of the present invention. Referring to FIG. 10, the method for adjusting the working power of the radio frequency generation module 230 may include the following steps:

Step S1002: Obtaining the temperature of the object to be processed.

Step S1004: Determining whether the change rate of the temperature of the object to be processed is greater than or equal to the first temperature rate threshold or not; if yes, executing step S1006; and if not, executing step S1008.

Step S1006: Enabling the radio frequency generation module 230 to work at the rated power, and then, returning to step S1002.

Step S1008: Determining whether the change rate of the temperature of the object to be processed is greater than or equal to the second temperature rate threshold or not; if yes, executing step S1010; and if not, executing step S1012.

Step S1010: Enabling the radio frequency generation module 230 to work at 50 to 60% of the rated power; in this step, enabling the radio frequency generation module 230 to work at 50% of the rated power; and then, returning to step S1002.

Step S1012: Enabling the radio frequency generation module 230 to work at 20 to 30% of the rated power; in this step, enabling the radio frequency generation module 230 to work at 25% of the rated power; and then, returning to step S1002.

Figure 11:
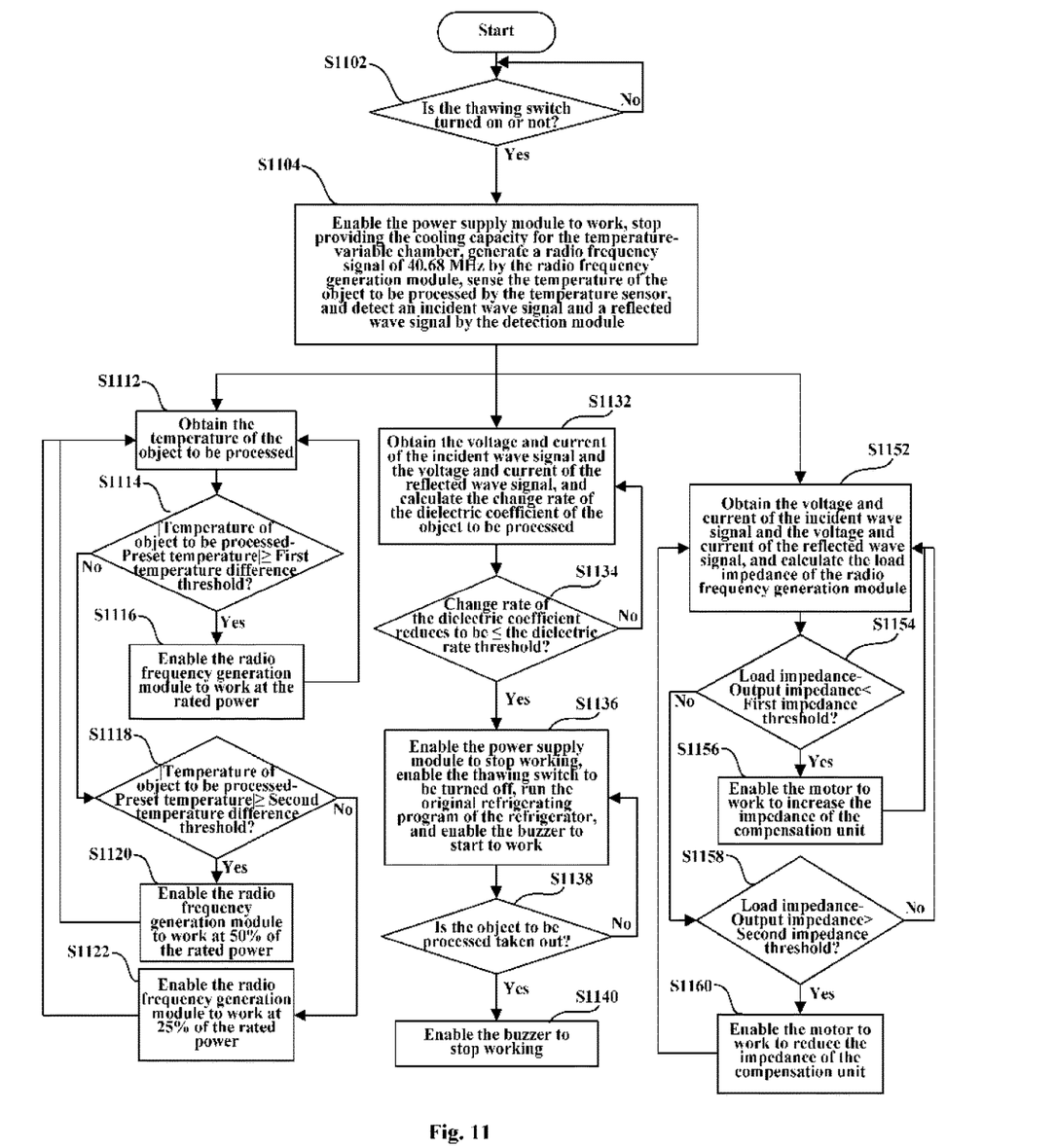
FIG. 11 is a detailed flow chart of a thawing method for a refrigerator according to an embodiment of the present invention.

FIG. 11 is a detailed flow chart of a thawing method for a refrigerator 10 according to an embodiment of the present invention. Referring to FIG. 11, the thawing method for the refrigerator 10 may include the following steps:

Step S1102: Determining whether the thawing switch 124 is turned on or not; if yes, executing step S1104; and if not, executing step S1102.

Step S1104: Enabling the power supply module 142 to start to work, enabling the refrigerating system of the refrigerator 10 to stop providing the is cooling capacity for the containing space provided with the thawing device 200, generating a radio frequency signal of 40 to 42 MHz by the radio frequency generation module 230, and detecting an incident wave signal and a reflected wave signal of the electrical connection wire connecting the radio frequency generation module 230 to the upper electrode plate 240a by the detection module 250, where in this step, the thawing device 200 is disposed in the temperature-variable chamber 120, and the frequency of the radio frequency signal generated by the radio frequency generation module 230 is 40.68 MHz; and then, executing steps S1112, S1132 and S1152.

Step S1112: Obtaining the temperature of the object to be processed.

Step S1114: Determining whether the absolute value of the difference between the temperature of the object to be processed and the preset temperature constant value is greater than or equal to the first temperature difference threshold or not; if yes, executing step S1116; and if not, executing step S1118.

Step S1116: Enabling the radio frequency generation module 230 to work at rated power, and then, returning to step S1112.

Step S1118: Determining whether the absolute value of the difference between the temperature of the object to be processed and the preset temperature constant value is greater than or equal to the second temperature difference threshold or not; if yes, executing step S1120; and if not, executing step S1122.

Step S1120: Enabling the radio frequency generation module 230 to work at 50 to 60% of the rated power; in this step, enabling the radio frequency generation module 230 to work at 50% of the rated power; and then, returning to step S1112.

Step S1122: Enabling the radio frequency generation module 230 to work at 20 to 30% of the rated power; in this step, enabling the radio frequency generation module 230 to work at 25% of the rated power; and then, returning to step S1112.

Step S1132: Obtaining the voltage and current of the incident wave signal and the voltage and current of the reflected wave signal, and calculating the change rate $\Delta\varepsilon/\Delta t$ of the dielectric coefficient of the object to be processed.

Step S1134: Determining whether the change rate $\Delta\varepsilon/\Delta t$ of the dielectric coefficient of the object to be processed is less than or equal to the dielectric rate threshold or not; if yes, executing step S1136; and if not, executing step S1132.

Step S1136: Enabling the power supply module 142 to stop working, enabling the thawing switch 124 to be reset (turned off), running the original refrigerating program of the refrigerator 10, and enabling the buzzer to start to work.

Step S1138: Determining whether the object to be processed is taken out of the thawing chamber 214 or not; if yes, executing step S1140; and if not, executing step S1136.

Step S1140: Enabling the buzzer to stop working.

Step S1152: Obtaining the voltage and current of the incident wave signal and the voltage and current of the reflected wave signal, and calculating the load impedance $Z_2$ of the radio frequency generation module 230.

Step S1154: Determining whether the difference between the load impedance $Z_2$ of the radio frequency generation module 230 and the output impedance $Z_1$ of the radio frequency generation module is less than the first impedance threshold or not; if yes, executing step S1156; and if not, executing step S1158.

Step S1156: Enabling the motor of the load compensation module 260 to work to increase the impedance of the compensation unit, and then, returning to step S1152.

Step S1158: Determining whether the difference between the load impedance $Z_2$ of the radio frequency generation module 230 and the output impedance $Z_1$ is greater than the second impedance threshold or not; if yes, executing step S1160; and if not, executing step S1152.

Step S1160: Enabling the motor of the load compensation module 260 to work to reduce the impedance of the compensation unit, and then, returning to the S1152. (It can be understood by those skilled in the art that when a program runs to step S1136, the power supply module 142 stops working, i.e., stops supplying power to the thawing device 200; and the radio frequency generation module 230, the temperature sensor 219, the detection module 250 and the load compensation module 260 stop working. That is, when the change rate $\Delta\varepsilon/\Delta t$ of the dielectric coefficient of the object to be processed decreases to be less than or equal to the dielectric rate threshold, the temperature sensor 219 stops sensing the temperature of the object to be processed, the detection module 250 stops detecting the incident wave signal and the reflected wave signal of the electrical connection wire connecting the radio frequency generation module 230 to the upper electrode plate 240a, and the load compensation module 260 stops working.)

A thawing working flow of a refrigerator 10 according to an embodiment of the present invention may include: when a user turns on the thawing switch 124, the power supply module 142 starts to supply power, the radio frequency generation module 230 generates a radio frequency signal of 40.68 MHz, and the temperature sensor 219, the detection module 250 and the load compensation module 260 start to work. The temperature sensor 219 senses the temperature of the object to be processed, and the detection module 250 detects the incident wave signal and the reflected wave signal of the electrical connection wire connecting the radio frequency generation module 230 to the upper electrode plate 240a, and calculates the load impedance $Z_2$ of the radio frequency generation module 230 and the change rate $\Delta\varepsilon/\Delta t$ of the dielectric coefficient. In the whole thawing working flow, when the absolute value of the difference between the temperature of the object to be processed and the preset temperature constant value decreases or the change rate of the temperature of the object to be processed decreases, the working power of the radio frequency generation module 230 is reduced to prevent the object to be processed from being excessively thawed. When the difference between the load impedance $Z_2$ of the radio frequency generation module 230 and the output impedance $Z_1$ of the radio frequency generation module is less than the first impedance threshold or greater than the second impedance threshold, the load compensation module 260 adjusts the impedance of the compensation unit through the motor so as to adjust the load impedance $Z_2$ of the radio frequency generation module 230, so that the difference between the load impedance $Z_2$ of the radio frequency generation module 230 and the output impedance $Z_1$ is always greater than or equal to the first impedance threshold and less than or equal to the second preset threshold. When the change rate $\Delta\varepsilon/\Delta t$ of the dielectric coefficient of the object to be processed is less than or equal to the second rate threshold, the power supply module 142 stops supplying power, the radio frequency generation module 230, the temperature sensor 219, the detection module 250 and the load compensation module 260 stop working, and the buzzer starts to work. When the user takes the object to be processed out of the thawing chamber 214, the buzzer stops working.

The above detailed descriptions are only for the specific descriptions of the feasible implementations of the present invention, and are not intended to limit the protection scope of the present invention. Equivalent implementations or modifications that do not depart from the spirit of the present invention are intended to be included within the protection scope of the present invention.

What is claimed is:

1. A refrigerator, comprising a refrigerator body defining at least one containing space, a compartment door for opening and closing the at least one containing space separately, and a thawing device disposed in one of the containing spaces, wherein the thawing device comprises:
   a cavity, defining a thawing chamber having a forward opening therein, the thawing chamber being configured for placement of an object to be processed;
   a device door, disposed at the forward opening of the thawing chamber and configured to open and close the thawing chamber;
   a radio frequency generation module, configured to generate a radio frequency signal; and an upper electrode plate and a lower electrode place, horizontally disposed on a top wall and a bottom wall of the thawing chamber respectively and electrically connected with the radio frequency generation module respectively to generate radio frequency waves of corresponding frequencies in the thawing chamber according to the radio frequency signal and thaw the object to be processed in the thawing chamber; and at least one temperature sensor is disposed on an inner wall of the thawing chamber and configured to sense a temperature of the object to be processed and adjust a working power of the radio frequency generation module according to the temperature of the object to be processed to prevent the object to be processed from being excessively thawed;

wherein the radio frequency generation module is configured as follows:

when an absolute value of a difference between the temperature of the object to be processed and a preset temperature constant value is greater than or equal to a first temperature difference threshold, the working power is a rated power;

when the absolute value of the difference between the temperature of the object to be processed and the preset temperature constant value is less than the first temperature difference threshold and greater than or equal to a second temperature difference threshold, the working power is 50 to 60% of the rated power; and when the absolute value of the difference between the temperature of the object to be processed and the preset temperature constant value is less than the second temperature difference threshold, the working power is 20 to 30% of the rated power, wherein the first temperature difference threshold is greater than the second temperature difference threshold.

2. The refrigerator according to claim 1, wherein the number of the at least one temperature sensor is three; the three temperature sensors are respectively disposed on two transverse side walls and a rear wall of the thawing chamber; and the temperature of the object to be processed is an average value of temperatures sensed by the three temperature sensors.

3. The refrigerator according to claim 2, wherein the three sensors are disposed at intervals in a vertical direction of the thawing device.

4. The refrigerator according to claim 1, wherein the radio frequency generation module is configured as follows:

when a change rate of the temperature of the object to be processed is greater than or equal to a first temperature rate threshold, the working power is a rated power;

when the change rate of the temperature of the object to be processed is less than the first temperature rate threshold and greater than or equal to a second temperature rate threshold, the working power is 50 to 60% of the rated power; and when the change rate of the temperature of the object to be processed is less than the second temperature rate threshold, the working power is 20 to 30% of the rated power, wherein, the first temperature rate threshold is greater than the second temperature rate threshold.

5. The refrigerator according to claim 1, further comprising: a thawing switch disposed on any one of the compartment doors and configured to control the start and stop of a thawing program; and the radio frequency generation module being configured to:

start to work when the thawing switch is turned on; and stop working when the thawing switch is turned off.

6. The refrigerator according to claim 5, wherein a refrigerating system of the refrigerator is configured to:

stop providing a cooling capacity for the containing space provided with the thawing device when the thawing switch is turned on; and run an original refrigerating program of the refrigerator when the thawing switch is turned off.

7. The refrigerator according to claim 1, wherein the thawing device further comprises: a detection module, configured to detect an incident wave signal and a reflected wave signal of an electrical connection wire connecting the radio frequency generation module to the upper electrode plate, and calculate a load impedance of the radio frequency generation module according to a voltage and a current of the incident wave signal and a voltage and a current of the reflected wave signal.

8. The refrigerator according to claim 7, wherein the thawing device further comprises: a load compensation module, configured to controllably increase or reduce the load impedance of the radio frequency generation module, and enable a difference between the load impedance of the radio frequency generation module and an output impedance of the radio frequency generation module to be greater than or equal to a first impedance threshold and less than or equal to a second present impedance threshold to improve the thawing efficiency of the object to be processed.

9. The refrigerator according to claim 8, wherein the detection module is configured to further calculate a change rate of a dielectric coefficient of the object to be processed according to the load impedance of the radio frequency generation module, and the radio frequency generation module is configured to:

stop working when the change rate of the dielectric coefficient of the object to be processed decreases to be less than or equal to a dielectric rate threshold.

10. A refrigerator, comprising a refrigerator body defining at least one containing space, a compartment door for opening and closing the at least one containing space separately, and a thawing device disposed in one of the containing spaces, wherein the thawing device comprises:

a cavity, defining a thawing chamber having a forward opening therein, the thawing chamber being configured for placement of an object to be processed;

a device door, disposed at the forward opening of the thawing chamber and configured to open and close the thawing chamber;

a radio frequency generation module, configured to generate a radio frequency signal; and an upper electrode plate and a lower electrode place, horizontally disposed on a top wall and a bottom wall of the thawing chamber respectively and electrically connected with the radio frequency generation module respectively to generate radio frequency waves of corresponding frequencies in the thawing chamber according to the radio frequency signal and thaw the object to be processed in the thawing chamber; and at least one temperature sensor is disposed on an inner wall of the thawing chamber and configured to sense a temperature of the object to be processed and adjust a working power of the radio frequency generation module according to the temperature of the object to be processed to prevent the object to be processed from being excessively thawed;

wherein the radio frequency generation module is configured as follows:

when a change rate of the temperature of the object to be processed is greater than or equal to a first temperature rate threshold, the working power is a rated power;

when the change rate of the temperature of the object to be processed is less than the first temperature rate threshold and greater than or equal to a second temperature rate threshold, the working power is 50 to 60% of the rated power; and when the change rate of the temperature of the object to be processed is less than the second temperature rate threshold, the working power is 20 to 30% of the rated power, wherein the first temperature rate threshold is greater than the second temperature rate threshold.

11. The refrigerator according to claim 10, wherein the radio frequency generation module is configured as follows:

when an absolute value of difference between the temperature of the object to be processed and a present temperature constant value is greater than or equal to a first temperature difference threshold, the working power is a rated power;

when the absolute value of the difference between the temperature of the object to be processed and the preset temperature constant value is less than the first temperature difference threshold and greater than or equal to a second temperature difference threshold, the working power is 50 to 60% of the rated power; and when the absolute value of the difference between the temperature of the object to be processed and the present temperature constant value is less than the second temperature difference threshold, the working power is 20 to 30% of the rated power, wherein the first temperature difference threshold is greater than the second temperature difference threshold.

12. A refrigerator, comprising a refrigerator body defining at least one containing space, a compartment door for opening and closing the at least one containing space separately, and a thawing device disposed in one of the containing spaces, wherein the thawing device comprises:

a cavity, defining a thawing chamber having a forward opening therein, the thawing chamber being configured for placement of an object to be processed;

a device door, disposed at the forward opening of the thawing chamber and configured to open and close the thawing chamber;

a radio frequency generation module, configured to generate a radio frequency signal; and an upper electrode plate and a lower electrode place, horizontally disposed on a top wall and a bottom wall of the thawing chamber respectively and electrically connected with the radio frequency generation module respectively to generate radio frequency waves of corresponding frequencies in the thawing chamber according to the radio frequency signal and thaw the object to be processed in the thawing chamber; and at least one temperature sensor is disposed on an inner wall of the thawing chamber and configured to sense a temperature of the object to be processed and adjust a working power of the radio frequency generation module according to the temperature of the object to be processed to prevent the object to be processed from being excessively thawed, wherein the thawing device further comprises: a detection module, configured to detect an incident wave signal and a reflected wave signal of an electrical connection wire connecting the radio frequency generation module to the upper electrode plate, and calculate a load impedance of the radio frequency generation module according to a voltage and a current of the incident wave signal and a voltage and a current of the reflected wave signal, and wherein the thawing device further comprises: a load compensation module, configured to controllably increase or reduce the load impedance of the radio frequency generation module, and enable a difference between the load impedance of the radio frequency generation module and an output impedance of the radio frequency generation module to be greater than or equal to a first impedance threshold and less than or equal to a second present impedance threshold to improve the thawing efficiency of the obj ect to be processed.

13. The refrigerator according to claim 12, wherein the detection module is configured to further calculate a change rate of a dielectric coefficient of the object to be processed according to the load impedance of the radio frequency generation module, and the radio frequency generation module is configured to:

stop working when the change rate of the dielectric coefficient of the object to be processed decreases to be less than or equal to a dielectric rate threshold.

* * * * *